(12) United States Patent
Harrington

(10) Patent No.: US 6,926,296 B1
(45) Date of Patent: Aug. 9, 2005

(54) MULTI-PERSON VELOCIPEDE

(76) Inventor: David Harrington, P.O. Box 432, Western, NE (US) 68464

( * ) Notice: Subject to any disclaimer, the term of this patent is extended or adjusted under 35 U.S.C. 154(b) by 104 days.

(21) Appl. No.: 10/661,733

(22) Filed: Sep. 12, 2003

(51) Int. Cl.[7] ............................................. B62K 13/06
(52) U.S. Cl. ...................... 280/209; 280/282; 280/231
(58) Field of Search ............................... 280/230–234, 280/209, 282

(56) References Cited

U.S. PATENT DOCUMENTS

| | | | |
|---|---|---|---|
| 0,264,855 A | 9/1882 | Burley | |
| 0,598,322 A | 2/1898 | Kummer | |
| 1,219,295 A | 3/1917 | Hadley | |
| 3,062,559 A | 11/1962 | Hewitt | 280/202 |
| 3,107,105 A | 10/1963 | Heriford | 280/211 |
| 3,608,917 A * | 9/1971 | Cogliano | 280/7.16 |
| 3,664,684 A | 5/1972 | Long | 280/231 |
| 3,717,360 A * | 2/1973 | Kennedy | 280/231 |
| 3,866,945 A * | 2/1975 | Bingham | 280/202 |
| 3,902,738 A * | 9/1975 | Gandrud | 280/209 |
| 3,910,599 A * | 10/1975 | Thomas | 280/234 |
| 5,326,121 A * | 7/1994 | Fisher | 280/282 |
| 5,342,074 A * | 8/1994 | Amdahl et al. | 280/209 |
| 5,484,152 A | 1/1996 | Nunes et al. | 280/282 |
| 5,511,809 A * | 4/1996 | Sagi | 280/209 |
| D408,761 S | 4/1999 | Challoner | D12/109 |
| 6,022,036 A * | 2/2000 | Chartrand | 280/209 |

* cited by examiner

Primary Examiner—Lesley D. Morris
Assistant Examiner—L. Lum
(74) Attorney, Agent, or Firm—Thomte, Mazour & Niebergall; Shane M. Niebergall

(57) ABSTRACT

A multi-person velocipede is provided with a pair of interconnected frame members. A pair of rotatable forward wheels are rigidly coupled to the forward portion of the frames, and a pair of rotatable rearward wheels are pivotably coupled to the rearward portion of the frames. Sets of pedals operatively engage the forward wheels to provide power, braking and turning operations to the velocipede.

17 Claims, 2 Drawing Sheets

MULTI-PERSON VELOCIPEDE

BACKGROUND OF THE INVENTION

The present invention relates to velocipedes, and more particularly to a multi-person velocipede, which is steered and braked using only the pedal power provided by the users.

DESCRIPTION OF THE PRIOR ART

Multi-wheel velocipedes have been in existence for many years and have taken many different forms. From bicycles to tricycles and quadricycles, velocipedes have provided many different forms of transportation and recreation. Some of these velocipedes have even been designed for multiple operators. However, designing a multi-person velocipede presents a number of challenging issues. First, the designer must decide how many operators and how many passengers will occupy the velocipede at any one time. Thereafter, the basic concerns of which of the operators will power, brake and steer the velocipede must be addressed. These are not simple issues to tackle, as the prior art has discovered.

U.S. Pat. No. 264,855 discloses a multi-person velocipede having two rearward wheels and a single forward wheel. A seat is positioned above each of the wheels to carry an operator. Each wheel is provided with a directly-geared crank for providing power to the velocipede. The "tricycle built for three" is steered only by the operator sitting above the forward wheel. Accordingly, the rear passengers provide little more than power to the velocipede.

U.S. Pat. No. 598,322 teaches a tricycle built for two having a single U-shaped frame that positions the operators in a side-by-side fashion above a pair of forward wheels. Both operators provide power to the velocipede, and both operate a pair of independently-moving handlebars that simultaneously turn a single rearward wheel through a paired linkage system. Accordingly, the velocipede is properly turned when both operators turn their handlebars in substantially the same manner at the substantially the same time. However, operation of the handlebars in even slightly different directions or at different magnitudes may nullify or substantially exaggerate a turning operation. Moreover, the addition of a turning linkage increases the likelihood of mechanical failure and possible injury.

Similarly, U.S. Pat. No. 5,511,809 discloses a velocipede that is comprised of a pair of generally horizontally-spaced bicycle frames that are traditional in design but coupled to one another at their forward and rearward ends. Both operators provide power to the velocipede through a multi-geared system secured on both frames. The operators are both responsible for braking and turning operations as well. The independent handlebars of the velocipede are coupled to pairs of pivotable forks that each engage a single rotating and turnable forward wheel. The independent handlebars are coupled together through a pivoting linkage system. Again, the velocipede demonstrates a system that requires the operators to use substantially similar gear selections, braking actions, and independent turning actions, increasing the likelihood of a problem or failure in powering, braking or turning the velocipede.

Accordingly, what is needed is a multi-person velocipede that permits each of the operators to participate in powering, braking and turning the velocipede in a safe and simple fashion.

SUMMARY OF THE INVENTION

The multi-person velocipede of the present invention is generally provided with first and second frame members, each having a forward and rearward wheel coupled thereto. The frame members are preferably coupled to one another with a rigid support member that maintains a horizontally-spaced relationship between the frames. Each frame member is provided with at least one seat on which an operator may sit and operate a set of pedals operatively coupled to the forward wheel. In a preferred embodiment, a single rigid handlebar extends transversely with the two frames at their forward ends.

Power is provided to the velocipede through their respective set of pedals, which are preferably directly geared to the forward wheels. Braking of the velocipede is also initiated by one or both of the operators through a simple reverse pedaling pressure. Turning of the velocipede is achieved by one operator engaging in a braking operation while the opposite operator continues to pedal in a generally forward direction. The velocipede may also be turned by having one operator pedal at a faster rate than the oppositely seated operator. The rear wheels are preferably mounted to their respective frames so that they pivot freely about a generally vertical axis to assist in turning the velocipede.

It is therefore a principal object of the present invention to provide a multi-person velocipede that simply permits its operators to power, brake and turn the velocipede.

A further object of the present invention is to provide a multi-person velocipede that can be turned by its operators without pivoting the forward wheels of the velocipede about a generally vertical axis.

Still another object of the present invention is to provide a multi-person velocipede that is turned by its operators through simple increases in power or braking to one side of the velocipede.

Yet another object of the present invention is to provide a multi-person velocipede having a pair of rotatable forward wheels that are rigidly coupled to a frame and a pair of rotatable rearward wheels that are pivotably coupled to the frame.

These and other objects of the present invention will be apparent to those of skill in the art.

DESCRIPTION OF THE PREFERRED EMBODIMENT

Figure 1:
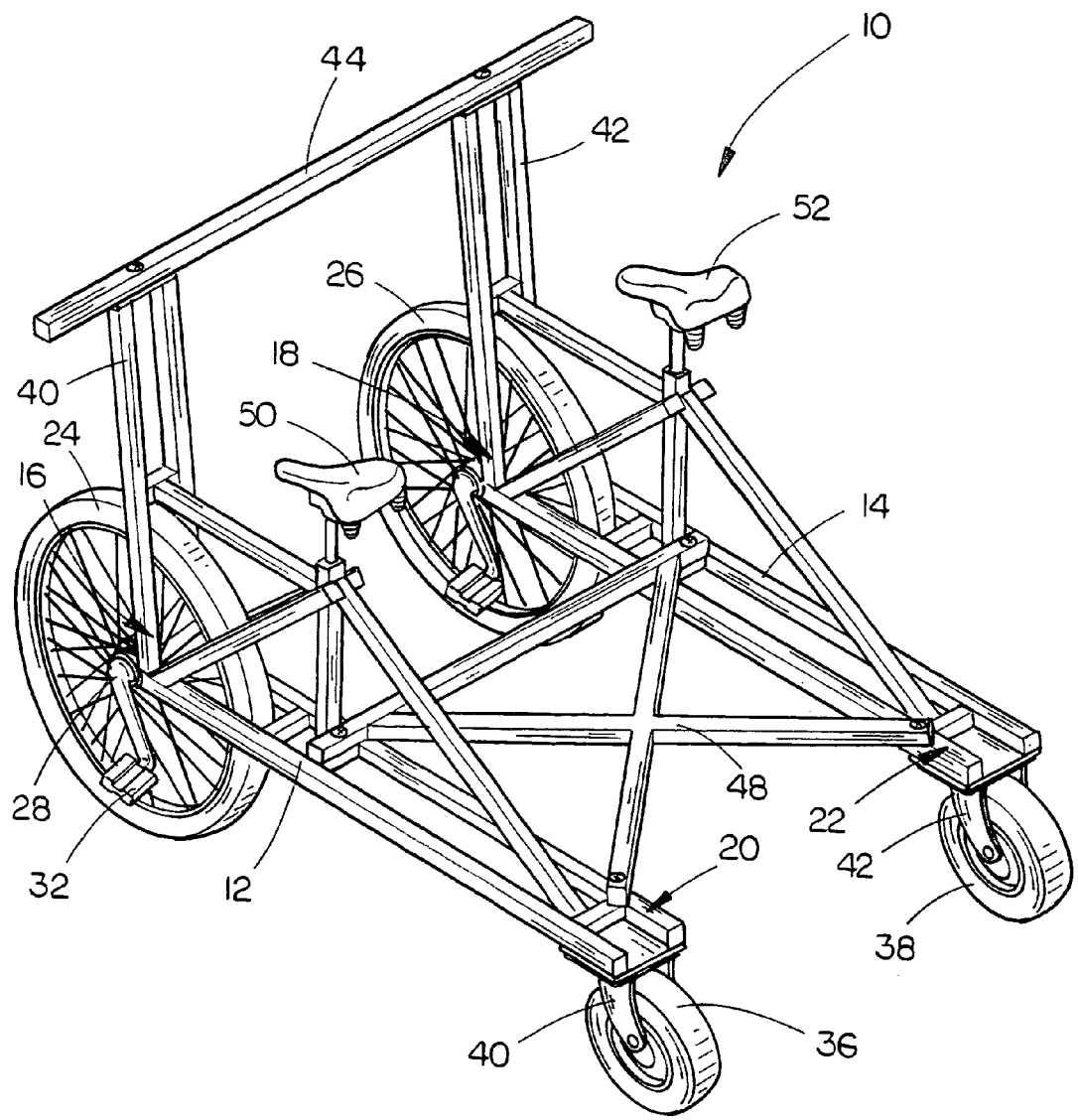
FIG. 1 is a rear perspective view of one embodiment of the multi-person velocipede of the present invention.
Figure 2:
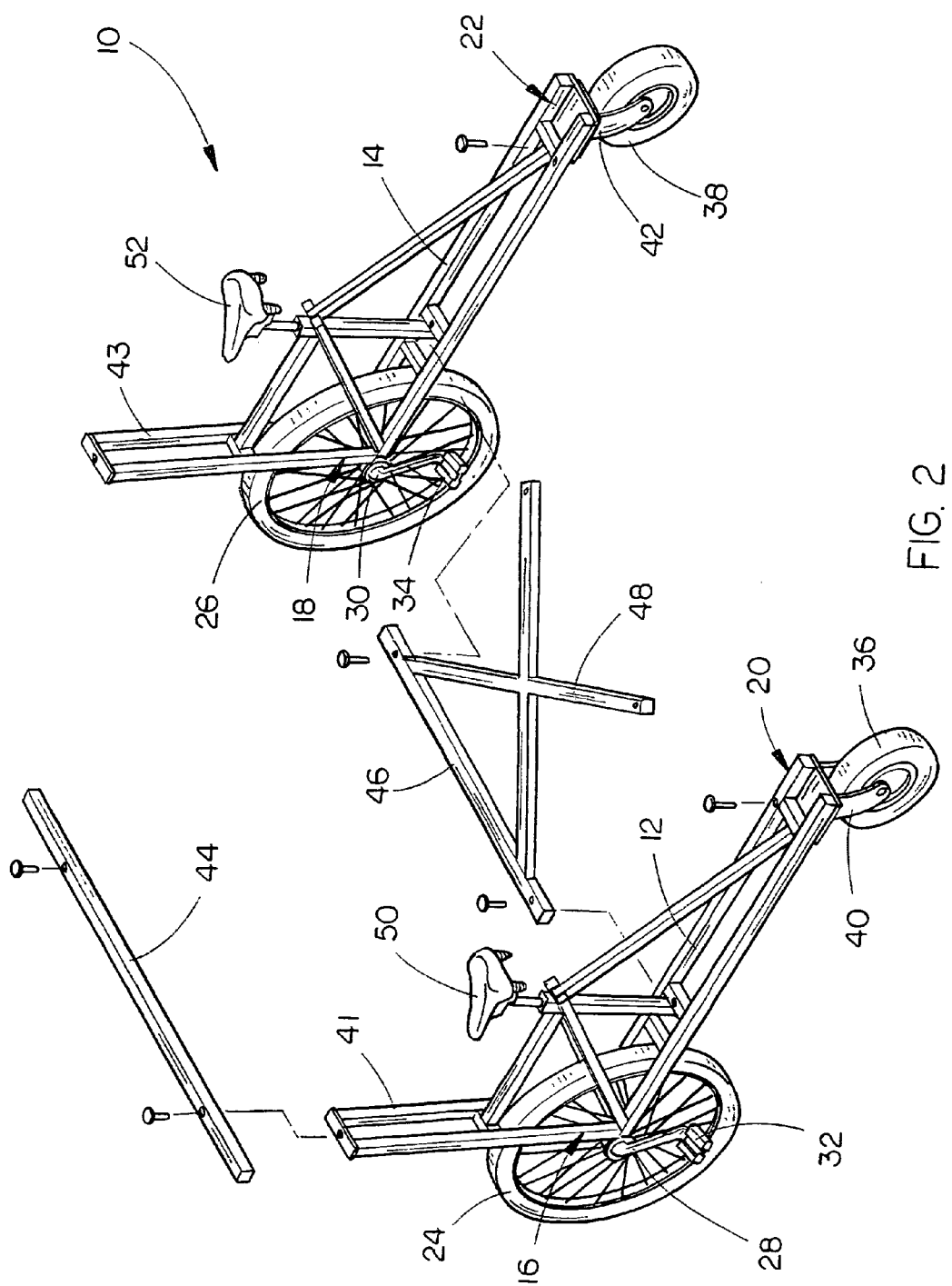
FIG. 2 is an exploded view of the multi-person velocipede of FIG. 1.

The multi-person velocipede 10 of the present invention is generally depicted in FIGS. 1 and 2 of the present invention. The velocipede 10 is generally provided with a first frame member 12 and a second frame member 14, both frame members having forward end portions 16 and 18 and rearward end portions 20 and 22, respectively. A first forward wheel 24 is rotatably coupled to the forward end portion 16 of the first frame, while a second forward wheel 26 is rotatably coupled to the forward end 18 of the second frame 14. The first forward wheel 24 is generally operated by a set of pedals having a pair of crank arms 28 and pair of pedals 32 coupled therewith. Similarly, the second forward wheel 26 is provided with a pair of crank arms 30 and a pair of pedals 34. The sets of pedals selectively rotate the forward wheels about axes extending perpendicularly through the forward wheels.

In a preferred embodiment, the sets of pedals are directly geared with the first wheel 24 and the second wheel 26 to eliminate the necessity of selectively adjustable gear systems. However, it is contemplated that a simple multi-gear assembly could be provided to both the forward wheels to enable the operators to change the gearing ratios in which the forward wheels are powered. In a preferred embodiment, the sets of pedals will be geared with the forward wheels to permit the operators to stop pedaling the cranks 28 and 30 in a forward direction while allowing the first forward wheel 24 and the second forward wheel 26 to continue rotating in a forward direction. However, it will also be preferred that the sets of pedals be geared with the forward wheels such that pressure-sensitive reverse pedaling of the cranks 28 and 30 will apply braking pressure to their respective first forward wheel 24 or second forward wheel 26. Such methods of directly gearing crank arms to wheels will be known to those of skill in the art and for purposes of conciseness will not be discussed in structural detail herein. It is contemplated, however, that other gearing methods could be provided such that the sets of pedals would literally be directly geared to the forward wheels so that the cranks 28 and 30 rotate in a forward direction with the forward wheels, without the option of independent movement or "coasting." In that embodiment, power and braking would be applied by each of the operators as described previously. Although it is further contemplated in yet another embodiment, standard hand-actuated braking systems could be provided to selectively engage the rims of the forward wheels to brake the velocipede 10.

The velocipede 10 is preferably provided with a first rearward wheel 36 and a second rearward wheel 38. The rearward wheels 36 and 38 are rotatably coupled to a pair of mounting brackets 40 and 42, which are coupled to the rearward end portions 20 and 22 of the first frame 12 and second frame 14. In a preferred embodiment, the mounting brackets 40 and 42 permit the rearward wheels 36 and 38 to freely pivot about generally vertical axes. Accordingly, a means for turning the velocipede 10 is provided without the necessity of pivoting either or both of the forward wheels 24 or 26 about a generally vertical axis. In this preferred embodiment, a first pair of forks 41 is coupled to the forward end portion 16 of the frame 12, and second pair of forks 43 is coupled to the forward end portion 18 of the second frame 14. A single elongated handlebar 44 is preferably provided to extend between the first pair of forks 41 and the second pair of forks 43. In this manner, the handlebar 44 not only provides the operators with a stable structure to grasp while operating the velocipede 10, but also provides a rigid interconnection between the first frame 12 and the second frame 14 such that the two frames are positioned in a horizontally-spaced relationship with one another. However, it is contemplated that one or more supports would couple the first frame 12 to the second frame 14 in a horizontally-spaced relationship such as the transverse support 46 and/or the cross-support 48 shown in FIGS. 1 and 2. Accordingly, while it is preferred that the support be provided by both the handlebar 44 and the supports 46 and/or 48, it is contemplated the handlebar 44 or the supports 46 and/or 48 could provide sufficient coupling strength between the first frame 12 and the second frame 14.

In use, a first operator will be preferably seated upon a first seat member 50, which is coupled to the upper end of the first frame 12. Similarly, it is preferred that a second operator be positioned atop a second seat member 52 atop the second frame 14. In this position, both operators are able to easily engage the sets of pedals in forward and rearward rotating manners. It is preferred that the velocipede 10 be operated in a forward direction by having both operators engage the sets of pedals in a forward pedaling fashion. Similarly, braking can be achieved by both operators in the manners described hereinabove. However, it is contemplated that the forces engaged by both operators need not be equal to satisfactorily operate the velocipede 10 of the present invention in a forward-moving or braking operation. The velocipede 10 is preferably turned during operation by both operators in one of two different ways. First, for example, when a left turn is desired, the second operator could continue operating cranks 30 in a generally forward direction while the first operator engaged the cranks 28 in a braking operation. A left turn can also be attained by simply providing a substantial increase of forward pedaling power to the cranks 30 while operating the cranks 28 in a coasting or moderately forward pedaling manner. Accomplishing right-hand turns is preferably achieved in one of the same but oppositely-directed fashions. In either such turning operation, the pivotable nature of the rearward wheels 36 and 38 will greatly enhance the turning radius of the velocipede 10. However, it is contemplated that the velocipede 10 could be engaged in either such turning operation with rigidly fixed forward and rearward wheels. It is also contemplated that providing the rearward wheels 36 and 38 with smaller diameters than those of forward wheels 24 and 26 will make it easier to bring the rearward end portions 20 and 22 of the frames 12 and 14 around any turn that is engaged.

Although the velocipede 10 is generally depicted and described herein as positioning the operators in an "upright" position, it is contemplated that a recumbent position for either or both operators would still satisfy the objects of the present invention. Moreover, it is contemplated that the addition of rearward passenger members or rearward operators could be easily incorporated with the design of the present invention.

In the drawings and in the specification, there have been set forth preferred embodiments of the invention; and although specific items are employed, these are used in a generic and descriptive sense only and not for purposes of limitation. Changes in the form and proportion of parts, as well as substitution of equivalents, are contemplated as circumstances may suggest or render expedient without departing from the spirit or scope of the invention as further defined in the following claims.

Thus it can be seen that the invention accomplishes at least all of its stated objectives.

I claim:
1. A multi-person velocipede, comprising:
    first and second frame members having forward and rearward end portions and long axes extending between said forward and rearward end portions;
    a first seat coupled to said first frame, and a second seat coupled to said second frame;
    a first forward wheel rotatably coupled to said forward end portion of said first frame, and a second forward wheel rotatably coupled to said forward end portion of said second frame;
    said first and second forward wheels being selectively rotatable about axes that extend generally perpendicular to the long axes of said first and second frames;

a first set of pedals operatively coupled to said first forward wheel, and a second set of pedals operatively coupled to said second forward wheel;

said first and second frames maintaining the axes of rotation of said first and second forward wheels in a generally fixed perpendicular orientation with respect to the long axes of said first and second frames while the velocipede is operated throughout a turn;

a first rearward wheel rotatably coupled to said rearward end portion of said first frame, and a second rearward wheel rotatably coupled to said rearward end portion of said second frame;

a first seat operatively coupled to said first frame intermediate said forward and rearward end portions, and a second seat operatively coupled to said second frame intermediate said forward and rearward end portions; and a support member operatively coupled to said first and second frames to maintain said first and second frames in a horizontal spaced relationship with one another.

2. The velocipede of claim 1 further comprising a single elongated handle bar coupled to the forward end portions of said first and second frames.

3. The velocipede of claim 2 wherein said handle bar is coupled to said forward end portions of said first and second frames in a fixed generally perpendicular orientation to the long axes of said first and second frames.

4. The velocipede of claim 1 wherein said first and second sets of pedals are coupled to said first and second forward wheels in fixed positions with respect to said first and second forward wheels.

5. The velocipede of claim 1 wherein said first and second rearward wheels are smaller in diameter that said first and second forward wheels.

6. The velocipede of claim 1 further comprising braking means operatively coupled to said first and second forward wheels for impeding forward movement of the velocipede.

7. A method of operating the velocipede of claim 6 with first and second operators, comprising:
    seating the first and second operators on said first and second seats;
    the first and second operators engaging said first and second sets of pedals in a generally forward pedaling manner to move the velocipede in a generally forward direction; and
    said first operator then actuating said braking means operatively coupled to said first forward wheel while said second operator continues the forward pedaling of said second set of pedals so that the velocipede moves in a generally left-arcing direction.

8. A method of operating the velocipede of claim 6 with first and second operators, comprising:
    seating the first and second operators on said first and second seats;
    the first and second operators engaging said first and second sets of pedals in a generally forward pedaling manner to move the velocipede in a generally forward direction; and
    said second operator then actuating said braking means operatively coupled to said second forward wheel while said first operator continues the forward pedaling of first second set of pedals so that the velocipede moves in a generally right-arcing direction.

9. A method of operating the velocipede of claim 6 with first and second operators, comprising:
    seating the first and second operators on said first and second seats;
    the first and second operators engaging said first and second sets of pedals in a generally forward pedaling manner to move the velocipede in a generally forward direction; and
    said first and second operators then actuating said braking means to slow the forward movement of the velocipede.

10. A method of operating the velocipede of claim 1 with first and second operators, comprising:
    seating the first and second operators on said first and second seats;
    the first and second operators engaging said first and second sets of pedals in a generally forward pedaling manner to move the velocipede in a generally forward direction; and
    said first operator then pedaling said first set of pedals at a rate faster than a rate at which the second operator pedals said second set of pedals so that the velocipede moves in a generally right-arcing direction.

11. A method of operating the velocipede of claim 1 with first and second operators, comprising:
    seating the first and second operators on said first and second seats;
    the first and second operators engaging said first and second sets of pedals in a generally forward pedaling manner to move the velocipede in a generally forward direction; and
    said second operator then pedaling said second set of pedals at a rate faster than a rate at which the first operator pedals said first set of pedals so that the velocipede moves in a generally left-arcing direction.

12. A multi-person velocipede, comprising:
    first and second frame members having forward and rearward end portions and long axes extending between said forward and rearward end portions;
    a first seat coupled to said first frame, and a second seat coupled to said second frame;
    a first forward wheel rotatably coupled to said forward end portion of said first frame, and a second forward wheel rotatably coupled to said forward end portion of said second frame;
    said first and second forward wheels being selectively rotatable about axes that extend generally perpendicular to the long axes of said first and second frames;
    a first set of pedals operatively coupled to said first forward wheel, and a second set of pedals operatively coupled to said second forward wheel;
    said first and second frames maintaining the axes of rotation of said first and second forward wheels in a generally perpendicular orientation with respect to the long axes of said first and second frames while the velocipede is operated;
    a first rearward wheel rotatably coupled to said rearward end portion of said first frame, and a second rearward wheel rotatably coupled to said rearward end portion of said second frame; said first and second rearward wheels being coupled to said first and second frames such that said first and second rearward wheels may freely swivel about generally vertical axes;
    a first seat operatively coupled to said first frame intermediate said forward and rearward end portions, and a second seat operatively coupled to said second frame intermediate said forward and rearward end portions; and
    a support member operatively coupled to said first and second frames to maintain said first and second frames in a horizontal spaced relationship with one another.

13. The velocipede of claim 12 wherein said first and second sets of pedals are coupled to said first and second forward wheels in fixed positions with respect to said first and second forward wheels.

14. The velocipede of claim 12 wherein said first and second rearward wheels are smaller in diameter that said first and second forward wheels.

15. The velocipede of claim 12 further comprising braking means operatively coupled to said first and second forward wheels for impeding forward movement of the velocipede.

16. The velocipede of claim 15 further comprising a single elongated handle bar coupled to the forward end portions of said first and second frames.

17. A multi-person velocipede, comprising:
 first and second frame members having forward and rearward end portions and long axes extending between said forward and rearward end portions;
 a first seat coupled to said first frame, and a second seat coupled to said second frame;
 a first forward wheel rotatably coupled to said forward end portion of said first frame, and a second forward wheel rotatably coupled to said forward end portion of said second frame;
 said first and second forward wheels being selectively rotatable about axes that extend generally perpendicular to the long axes of said first and second frames;
 a first set of pedals operatively coupled to said first forward wheel, and a second set of pedals operatively coupled to said second forward wheel;
 said first and second frames maintaining the axes of rotation of said first and second forward wheels in a generally perpendicular orientation with respect to the long axes of said first and second frames while the velocipede is operated;
 a first rearward wheel rotatably coupled to said rearward end portion of said first frame, and a second rearward wheel rotatably coupled to said rearward end portion of said second frame; said first and second rearward wheels being coupled to said first and second frames such that said first and second rearward wheels may freely swivel about generally vertical axes;
 a first seat operatively coupled to said first frame intermediate said forward and rearward end portions, and a second seat operatively coupled to said second frame intermediate said forward and rearward end portions;
 a support member operatively coupled to said first and second frames to maintain said first and second frames in a horizontal spaced relationship with one another; and
 a single elongated handle bar coupled to the forward end portions of said first and second frames; said handle bar being coupled to said forward end portions of said first and second frames in a fixed, generally perpendicular orientation to the long axes of said first and second frames.

* * * * *